US007972019B2

(12) United States Patent
Kitabayashi et al.

(10) Patent No.: US 7,972,019 B2
(45) Date of Patent: Jul. 5, 2011

(54) OPTICAL DEVICE AND PROJECTOR

(75) Inventors: Masashi Kitabayashi, Azumino (JP);
Kazuyuki Iinuma, Azumino (JP);
Nobuo Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 776 days.

(21) Appl. No.: 11/598,845

(22) Filed: Nov. 14, 2006

(65) Prior Publication Data
US 2007/0121079 A1 May 31, 2007

(30) Foreign Application Priority Data
Nov. 25, 2005 (JP) ................................. 2005-340831

(51) Int. Cl.
*G03B 21/00* (2006.01)
*G03B 21/14* (2006.01)
*G03B 21/22* (2006.01)
*G03B 21/26* (2006.01)
*G02F 1/1333* (2006.01)

(52) U.S. Cl. ............... 353/119; 353/31; 353/33; 349/58
(58) Field of Classification Search .................... 353/33, 353/81, 100, 119, 122, 30–31, 97; 349/7–10, 349/58
See application file for complete search history.

(56) References Cited

U.S. PATENT DOCUMENTS

| 6,053,616 | A | * | 4/2000 | Fujimori et al. | 353/119 |
| 6,320,709 | B1 | * | 11/2001 | Kitabayashi et al. | 359/831 |
| 6,322,217 | B1 | * | 11/2001 | Fujimori et al. | 353/31 |
| 6,454,416 | B2 | * | 9/2002 | Aoto et al. | 353/31 |
| 6,587,167 | B1 | * | 7/2003 | Fujimori et al. | 349/58 |
| 6,592,226 | B1 | * | 7/2003 | Fujimori | 353/31 |
| 6,834,964 | B2 | | 12/2004 | Nishihara et al. | |
| 6,854,848 | B2 | * | 2/2005 | Fujimori et al. | 353/20 |
| 6,880,938 | B2 | * | 4/2005 | Nakano | 353/119 |
| 7,114,816 | B2 | * | 10/2006 | Fujimori et al. | 353/119 |
| 7,148,945 | B2 | * | 12/2006 | Yanagisawa | 349/161 |
| 2005/0001985 | A1 | * | 1/2005 | Kitabayashi | 353/31 |
| 2005/0146689 | A1 | * | 7/2005 | Iechika et al. | 353/97 |
| 2005/0162621 | A1 | * | 7/2005 | Shirota | 353/81 |
| 2005/0179876 | A1 | | 8/2005 | Iinuma et al. | |
| 2005/0185145 | A1 | * | 8/2005 | Halsberghe et al. | 353/33 |
| 2006/0001821 | A1 | * | 1/2006 | Dewa et al. | 349/150 |
| 2008/0174741 | A1 | * | 7/2008 | Yanagisawa et al. | 353/31 |

FOREIGN PATENT DOCUMENTS

| CN | 1658064 A | 8/2005 |
| JP | 08-262432 A | 10/1996 |
| JP | 2002-229121 A | 8/2002 |
| JP | 2003-066404 A | 3/2003 |
| JP | 2003-121931 A | 4/2003 |

* cited by examiner

*Primary Examiner* — Tony Ko
*Assistant Examiner* — Jori S Reilly-Diakun
(74) *Attorney, Agent, or Firm* — AdvantEdge Law Group, LLC

(57) ABSTRACT

An optical device includes a plurality of light modulating devices for forming optical images and a color combining optical device. The optical device includes a first fixed member and a second fixed member for mounting the light modulating devices so as to face light flux incoming end surfaces of the color combining optical device. The first fixed member includes a plate-shaped first base portion mounted to oppose the light flux incoming end surface and having an opening for transmitting the light flux. The second fixed member includes a plate-shaped second base portion having an opening for transmitting the light flux. The first fixed member and the second fixed member are assembled in such a manner that the first base portion and the second base portion are opposed to each other.

14 Claims, 11 Drawing Sheets

F I G. 4
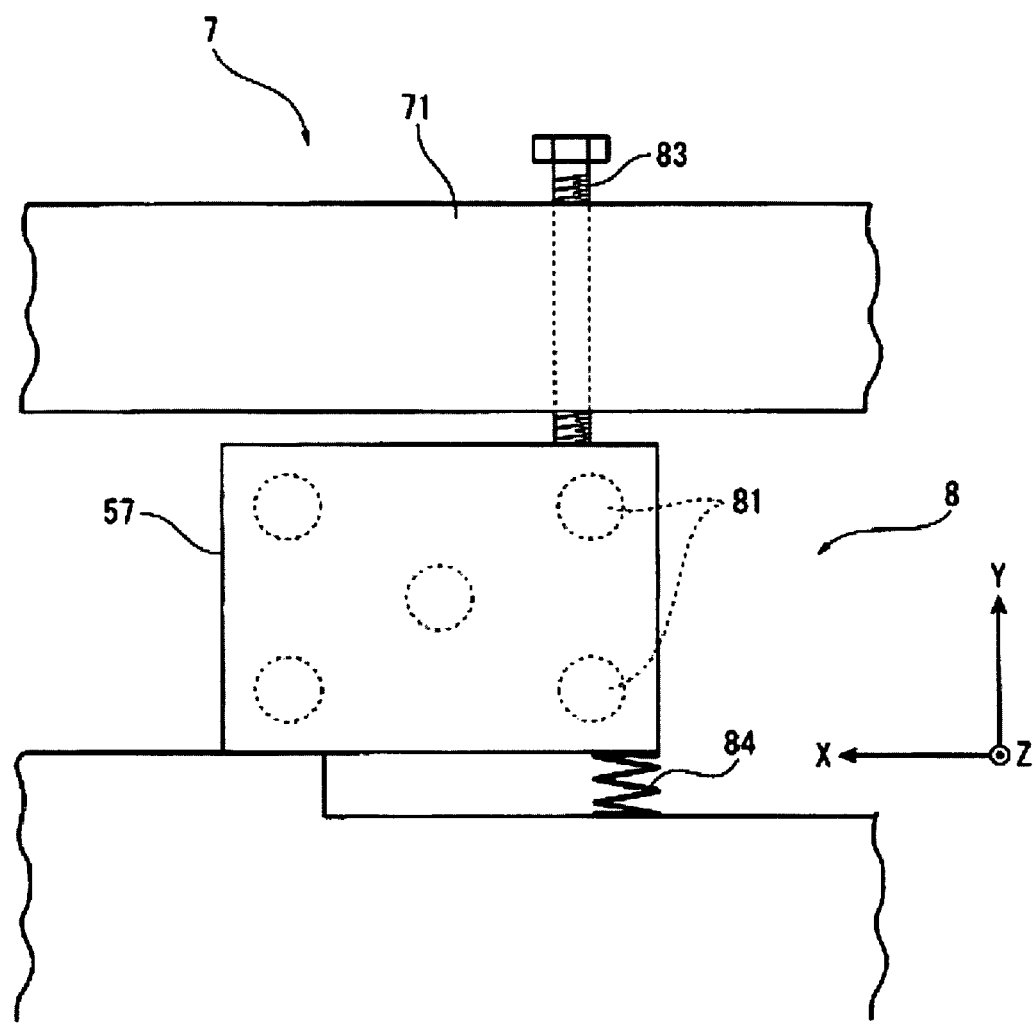

OPTICAL DEVICE AND PROJECTOR

BACKGROUND

1. Technical Field

The present disclosure relates to an optical device and a projector provided with the optical device.

2. Related Art

In the related art, a projector provided with a so-called three-plate optical device that separates a light flux emitted from a light source into red, green and blue color lights, that is, three primary colors by a color separating optical system using a dichroic mirror or the like, modulates each color light according to the image information by three liquid crystal panels (a light modulating device), combines the respective color lights after image modulation with a cross dichroic prism (a color combining optical device), and projects a color image in an enlarged scale via a projecting lens is known.

In the optical device as described above, assembleability is improved by assembling an optical element such as a liquid crystal panel or a polarizing plate integrally to a cross dichroic prism.

An example of the assembled structure of the optical device will be described (for example, see JP-A-2003-121931). The assembled structure in the above-described document includes a fixed member being fixed to a light flux incoming end surface of the cross dichroic prism having a plurality of pins projecting toward the light flux incoming side, a holding frame storing a liquid crystal panel in a frame, and a supporting member being mounted to the holding frame via the liquid crystal panel and holding the liquid crystal panel in cooperation with the holding frame therebetween. The liquid crystal panel is arranged so as to face the light flux incoming end surface of the cross dichroic prism by the pins of the fixed member being inserted into holes formed on a frame portion of the holding frame.

The liquid crystal panel is fixed to the fixed member by bonding the holes of the holding frame to the pins of the fixed member at an adequate focus alignment position with respect to the light flux incoming end surface of the cross dichroic prism.

When the projector is operated, heat is generated in the liquid crystal panel by transmission of the light flux, driving by electric signals, and so on. This heat may cause deterioration of the liquid crystal panel and hence deterioration of the image quality of a projected image. Therefore, it is necessary to be cooled efficiently as much as possible.

In the optical device disclosed in JP-A-2003-121931, since the liquid crystal panel is fixed to the fixed member by bonding between a side surface of the pin and an inner surface of the hole, displacement of the respective members at a bonding surface may occur due to vibrations or heat. In this case, displacement of the projecting lens of the liquid crystal panel from a back-focus position or displacement of pixel between the respective liquid crystal panels may result in deterioration of the image quality of the projected image.

SUMMARY

An advantage of some aspects of the disclosure is to provide an optical device and a projector which can maintain the image quality of a projected image and improve a cooling capability of heat generated in a light modulating device.

An optical device according to an aspect of the disclosure is an optical device including a plurality of light modulating devices for forming optical images by modulating a plurality of color lights into image information for each color light and a color combining optical device having a plurality of light flux incoming end surfaces opposing the respective light modulating devices for combining optical images formed by the respective light modulating devices, wherein the optical device includes a first fixed member and a second fixed member for mounting the light modulating devices so as to face the light flux incoming end surfaces of the color combining optical device, wherein the first fixed member includes a plate-shaped first base portion mounted to oppose the light flux incoming end surface and having an opening for transmitting the light flux and a pair of first upright strips extending upright from an outer peripheral edge of the first base portion toward the light flux incoming side and oppose to each other, wherein the second fixed member includes a plate-shaped second base portion having an opening for transmitting the light flux and a pair of second upright strips extending upright from an outer peripheral edge of the second base portion toward the light flux outgoing side and oppose to each other, wherein the first fixed member and the second fixed member are assembled in such a manner that the first base portion and the second base portion oppose to each other and the first upright strips and the second upright strips slide with respect to each other, and wherein the light modulating device is directly mounted to a peripheral edge of the opening of the second base portion.

According to an aspect of the disclosure, since the first upright strips and the second upright strips are assembled so as to slide with respect to each other, the first fixed member and the second fixed member can be assembled reliably. In other words, since abutment surfaces of the first fixed member and the second fixed member are larger in comparison with the related art, displacement of both members at the abutment surfaces of both upright strips can be prevented. Therefore, displacement of the light modulating device from the back-focus position, and displacement of pixels between the optical modulating devices can be prevented.

The light modulating device is not provided with a frame member or the like to be fitted around the light modulating device, and is supported by being directly mounted to the second fixed member. Accordingly, wind can easily hit on the light modulating device, and hence the cooling capability of the light modulating device can be improved.

In addition, since the light modulating device is not provided with the frame member or the like, simplification of the configuration of the optical device, reduction of the number of components, reduction of the cost, and reduction of the weight can be achieved.

Preferably, the first fixed member and the second fixed member are formed by performing sheet-metal-processing onto a plate-shaped metal plate.

According to an aspect of the disclosure, since the first fixed member and the second fixed member are formed by performing the sheet-metal-processing onto the plate-shaped metal plate, they can be formed easily. In addition, since the light modulating device is directly mounted to the second fixed member, heat generated in the light modulating device can easily be transferred to the metallic second fixed member. Therefore, the cooling capability of the light modulating device can be improved.

Preferably, the light modulating device is mounted to the light flux incoming side of the second base portion of the second fixed member.

According to an aspect of the disclosure, since the light modulating device is mounted to the light flux incoming side of the second fixed member, when an optical converting element such as a polarizing plate is arranged in a space formed between the first fixed member and the second fixed member, a space around the element can be widened. Therefore, the cooling capability of the optical converting element can be improved.

By arranging the second fixed member on the light flux outgoing side of the light modulating device, returned light reflected from the light flux incoming end surface of the color combining optical device can be reflected by the light flux outgoing side of the light modulating device to prevent the returned light from entering into the light modulating device.

Preferably, a cover member arranged on the light flux incoming side of the light modulating device and having an opening for transmitting the light flux is provided.

When light other than the color light, for example, light leaked from the light source, natural light, or the like is entered into the light modulating device, the quality of the optical image formed on the light modulating device may be impaired. In contrast, according to an aspect of the disclosure, by providing the cover member on the light flux incoming side of the light modulating device, the light other than the color light can be prevented from entering into the light modulating device, and the quality of the optical image formed on the light modulating device can be maintained.

Preferably, the cover member is formed by performing sheet-metal-processing on a plate-shaped metal plate.

According to an aspect of the disclosure, because the cover member is formed by performing the sheet-metal-processing on the plate-shaped metal plate, it can be formed easily. In addition, when the light modulating device is arranged so as to abut against the cover member, heat generated in the light modulating device can be transferred easily to the metallic cover member. Therefore, the cooling capability of the light modulating device can be improved.

Preferably, an optical converting element for optically converting an incoming light flux and emitting the same, and the cover member includes a supporting surface for supporting the optical converting element on the light flux incoming side thereof.

According to an aspect of the disclosure, since the optical converting element is integrally provided on the optical device, it is not necessary to provide a configuration for mounting the optical converting element on other members, for example, a housing of an apparatus such as a projector. Therefore, downsizing and simplification of the configuration of the apparatus such as the projector is achieved.

Since the optical converting element is provided integrally with the optical device, the mutual positional adjustment between the light modulating device and the optical converting element can be avoided when adjusting an optical axis of the light flux emitted from the light source after the optical device or other optical system device is manufactured and installed.

Preferably, the light modulating device is mounted to the light flux outgoing side of the second base portion of the second fixed member.

When light other than the color light, for example, light leaked from a light source device or natural light is entered into the light modulating device, the quality of the optical image formed on the light modulating device may be impaired. In contrast, according to an aspect of the disclosure, since the second fixed member is arranged on the light flux incoming side of the light modulating device, the light other than the color light is prevented from entering into the light modulating device by the second fixed member, and the quality of the optical image formed on the light modulating device can be maintained.

In addition, the light modulating device is arranged in a cylindrical space formed between the first fixed member and the second fixed member. Since the space has a cylindrical shape in this manner, desirable air ventilation is secured around the light modulating device, and hence the cooling capability of the light modulating device can be improved.

Preferably, a shielding member being interposed between the light modulating device and the first base portion of the first fixed member, and having an opening for transmitting light is provided.

According to an aspect of the disclosure, by arranging the shielding member on the light flux outgoing side of the light modulating device, returned light reflected from the light flux incoming end surface of the color combining optical device is reflected on the light flux outgoing side of the light modulating device to prevent the returned light from entering into the light modulating device.

Preferably, the shielding member is formed by performing sheet-metal-processing on a plate-shaped metal plate.

According to an aspect of the disclosure, since the shielding member is formed by performing the sheet-metal-processing on the plate-shaped metal plate, it can be formed easily. In addition, when the light modulating device is arranged so as to abut against the shielding member, heat generated in the light modulating device can be transferred easily to the metallic shielding member. Therefore, the cooling capability of the light modulating device can be improved.

Preferably, an optical converting element for optically converting an incoming light flux and emitting the same is provided, and the second fixed member includes a supporting surface for supporting the optical converting element on the light flux incoming side.

According to an aspect of the disclosure, since the optical converting element is integrally provided with the optical device, it is not necessary to provide a configuration for mounting the optical converting element on other members, for example, a housing of an apparatus such as a projector. Therefore, downsizing and simplification of the configuration of the apparatus such as the projector is achieved.

Since the optical converting element is provided integrally with the optical device, the mutual positional adjustment between the light modulating device and the optical converting element can be avoided when adjusting an optical axis of the light flux emitted from the light source after the optical device or other optical system device is manufactured and installed.

Preferably, one of the pair of first upright strips and the pair of second upright strips are formed with holes, and the other one of those is formed with projections to be inserted into the holes.

The light modulating device is required to be arranged at an adequate relative position with respect to a back-focus for projecting an optical image combined in the color combining optical device in enlarged scale and other light modulating device. In contrast, according to an aspect of the disclosure, the first fixed member and the second fixed member are not separated and disconnected from each other since the projections are supported simply by inserting the projections into the holes at the time of the positioning operation of the light modulating device. Accordingly, assembly of the first and second fixed members, and positioning operation of the light modulating device to be mounted to the second fixed member can be performed easily.

A projector according to an aspect of the disclosure includes a light source device, anyone of the above-described optical devices, and a projecting optical system for projecting the optical image formed on the optical device in an enlarged scale.

According to an aspect of the disclosure, since the optical device has the effects and advantages as described above, the same effects and advantages can be achieved.

BRIEF DESCRIPTION OF THE DRAWINGS

The disclosure will be described with reference to the accompanying drawings, wherein like numbers reference like elements.

FIG. 4 is a schematic plan view of a polarizing plate adjusting device according to the first embodiment.

DESCRIPTION OF EXEMPLARY EMBODIMENTS

Figure 1:
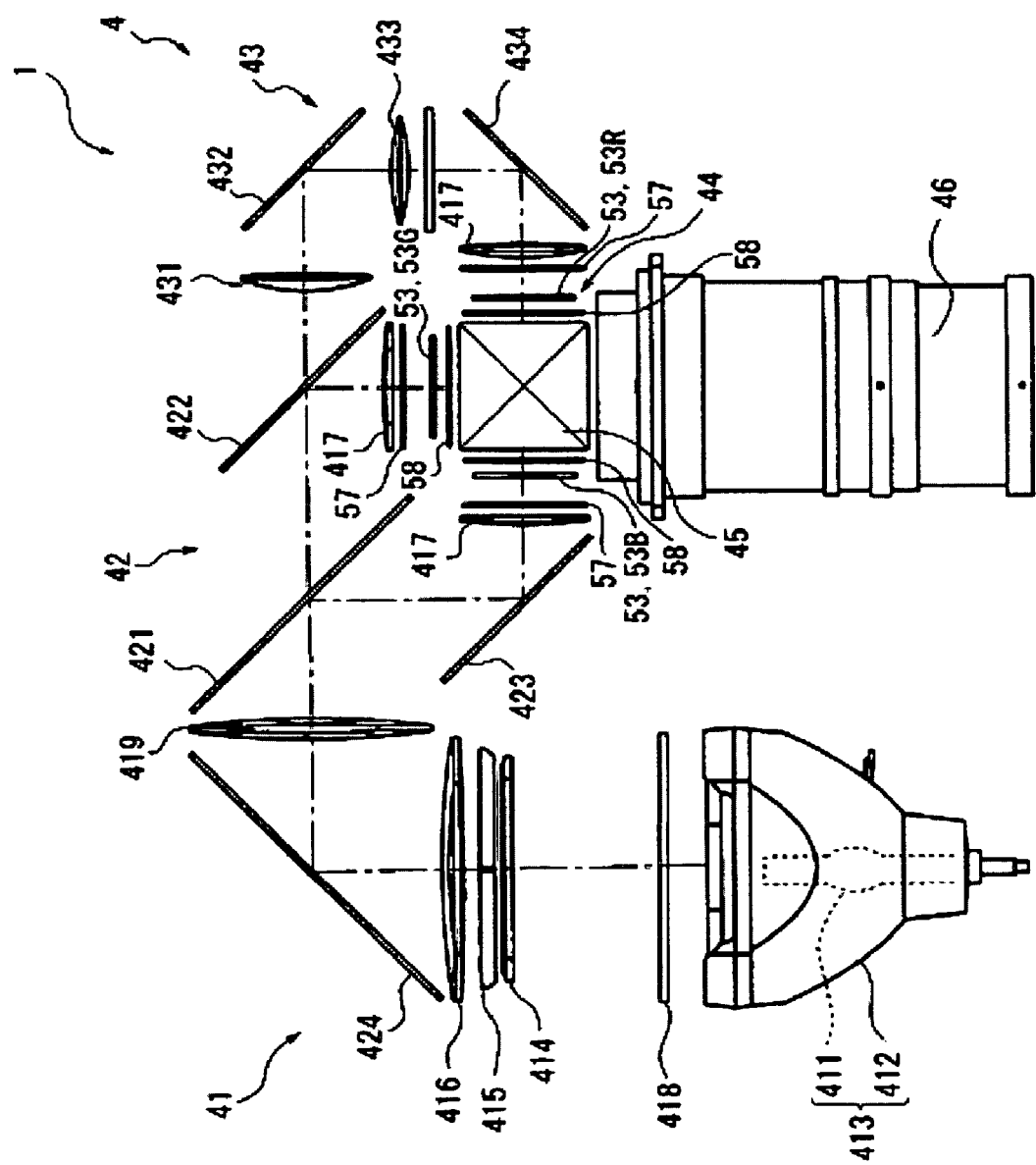
FIG. 1 is a schematic plan view showing an optical system of an optical unit according to a first embodiment.

Embodiments of the disclosure will be described below. In the respective embodiments, the same parts are represented by the same reference numerals and description will be omitted.

First Embodiment

Referring now to FIG. 1 to FIG. 5, a first embodiment of the disclosure will be described.

A projector 1 in this embodiment is adapted to modulate a light flux emitted from a light source according to image information to form an optical image and project the formed optical image on a screen in an enlarged scale. The projector 1 includes an optical unit 4 for forming the image by optical conversion, as well as a power source unit, a control unit, a cooling unit and so on, not shown in the drawing.

Configuration of Optical System of Optical Unit 4

The optical unit 4 is a unit for processing a light flux emitted from a light source lamp 411 optically to form an optical image corresponding to image information, and includes an integrator illumination optical system 41, a color separating optical system 42, a relay optical system 43, an optical device 44, and a projecting lens 46.

In FIG. 1, the integrator illumination optical system 41 is an optical system for illuminating image forming areas of three liquid crystal panels 53 (shown as liquid crystal panels 53R, 53G and 53B for each color light of red, green and blue respectively) which constitute the optical device 44 substantially uniformly, and includes a light source device 413, a first lens array 418, a second lens array 414 including an UV filter, a polarized light converting element 415, a first condensing lens 416, a reflecting mirror 424, and a second condensing lens 419.

The light source device 413 out of these members includes the light source lamp 411 as a radiating light source for emitting light in a radial pattern, and a reflector 412 for reflecting the light emitted from the light source lamp 411. A halogen lamp, a metal halide lamp, or a high-pressure mercury lamp is used as the light source lamp 411 in many cases. A parabolic mirror is used as the reflector 412. Alternatively, it is also possible to use an ellipsoidal mirror together with a collimator lens (concave lens) instead of the parabolic mirror.

The first lens array 418 has a configuration in which small lenses having a substantially rectangular contour when viewed in the direction of an optical axis are arranged in an matrix manner. Each small lens splits a light flux emitted from the light source lamp 411 into a plurality of light flux parts. The contour of each small lens is set to be similar to the shape of the image forming area of the liquid crystal panel 53. For example, when the aspect ratio (ratio between the lateral dimension and the vertical dimension) of the image forming area of the liquid crystal panel 53 is 4:3, the aspect ratio of each small lens is also set to 4:3.

The second lens array 414 has substantially the same configuration as the first lens array 418, and has a configuration including small lenses arranged in a matrix manner. The second lens array 414 has a function to form an image from images of the respective small lenses of the first lens array 418 onto the liquid crystal panel 53 together with the first condensing lens 416 and the second condensing lens 419.

The polarized light converting element 415 is arranged between the second lens array 414 and the first condensing lens 416 and integrated with the second lens array 414 as a unit. The polarized light converting element 415 in this structure is used for converting light from the second lens array 414 into one type of polarized light, whereby the utilization ratio of light in the optical device 44 is increased.

More specifically, the respective partial lights converted into the one type of polarized light by the polarized light converting element 415 are substantially superimposed finally on the liquid crystal panels 53R, 53G and 53B of the optical device 44 by the first condensing lens 416 and the second condensing lens 419. Since only one type of polarized light can be used in the projector employing the liquid crystal panel of a type which modulates the polarized light, about half the light from the light source lamp 411 which emits random polarized light cannot be used. Therefore, by using the polarized light converting element 415, the emitted light from the light source lamp 411 is converted into a substantially one type of polarized light, thereby improving utilization ratio of light in the optical device 44. The polarized light converting element 415 in this structure is introduced, for example, in JP-A-8-304739.

The color separating optical system 42 includes two dichroic mirrors 421, 422, and a reflecting mirror 423, and has a function to separate a plurality of light flux parts emitted from the integrator illumination optical system 41 into the three color lights of red, green and blue by the dichroic mirrors 421, 422.

The relay optical system 43 includes an incoming-side lens 431, a relay lens 433 and reflecting mirrors 432, 434, and has a function to introduce the color light, that is, the red right separated by the color separating optical system 42 to the liquid crystal panel 53B.

In this case, the dichroic mirror 421 of the color separating optical system 42, a red light component and a green light component of a light flux emitted from the integrator illumination optical system 41 are transmitted, and a blue light component is reflected. The blue light reflected by the dichroic mirror 421 is reflected from the reflecting mirror 423, passes through a field lens 417, aligned in direction of polarization by an incoming-side polarizing plate 57, and reaches the liquid crystal panel 53B for the blue color. The field lens 417 converts the respective light flux parts emitted from the second lens array 414 into a light flux parallel with a center axis thereof (main beam) thereof. The field lenses 417 provided on the light flux incoming side of the other liquid crystal panels 53G, 53R work in the same manner.

The green light out of the red light and the green light transmitted through the dichroic mirror 421 is reflected by the dichroic mirror 422, passes through the field lens 417, aligned in direction of polarization by the incoming-side polarizing plate 57, and reaches the liquid crystal panel 53G for the green color. On the other hand, the red light is transmitted through the dichroic mirror 422, passes through the relay optical system 43, then passed through the field lens 417, aligned in direction of polarization by the incoming-side polarizing plate 57, and reaches the liquid crystal panel 53R for the red light. The light passed through this relay optical system 43 may be the blue light.

The optical device 44 includes the liquid crystal panels 53R, 53G and 53B as three light modulating devices, the incoming-side polarizing plate 57 and an outgoing-side polarizing plate 58 as an optical converting element, and a cross dichroic prism 45 as a color combining optical device.

The liquid crystal panels 53R, 53G and 53B include, for example, a polysilicon TFT used as a switching element, and the respective color lights separated by the color separating optical system 42 are modulated according to the image information by the respective liquid crystal panel 53R, 53G, 53G, 53B and the incoming-side polarizing plate 57 and the outgoing-side polarizing plate 58 thereof to form an optical image.

The cross dichroic prism 45 is adapted to combine the images modulated by the respective color lights emitted from the three liquid crystal panels 53R, 53G and 53B to form a color image. The cross dichroic prism 45 is formed with a dielectric multi-layer film that reflects the blue light and a dielectric multi-layer film that reflects the red light into a substantially X-shape along the interfaces of four rectangular prisms, and the three color lights are combined by these dielectric multi-layer films. The color image combined by the cross dichroic prism 45 is emitted from the projecting lens 46 and projected on the screen in an enlarged scale. The mechanical configuration of the optical device 44 will be described later.

The respective optical systems 41, 42, 43, 44, 46 described above, not shown, are stored in an optical parts housing (not shown) stored in a housing of the projector 1.

In the projector 1 in this embodiment, the optical device 44 is cooled by a wind from a fan, an air-inlet port, and an exhaust port (not shown) provided in the projector 1. More specifically, cooling air is sucked through the air-inlet port formed on a lower surface of the housing of the projector 1 by a pair of fans arranged on both sides of the projecting lens 46 and the cooling air is sent toward the liquid crystal panels 53 (53R, 53G, 53B) and the respective polarizing plates 57, 58 upward from below. Then, the air after cooling is discharged to the outside from the exhaust port formed on a front surface of the housing of the projector 1.

Mechanical Configuration of Optical Device 44

Figure 2:
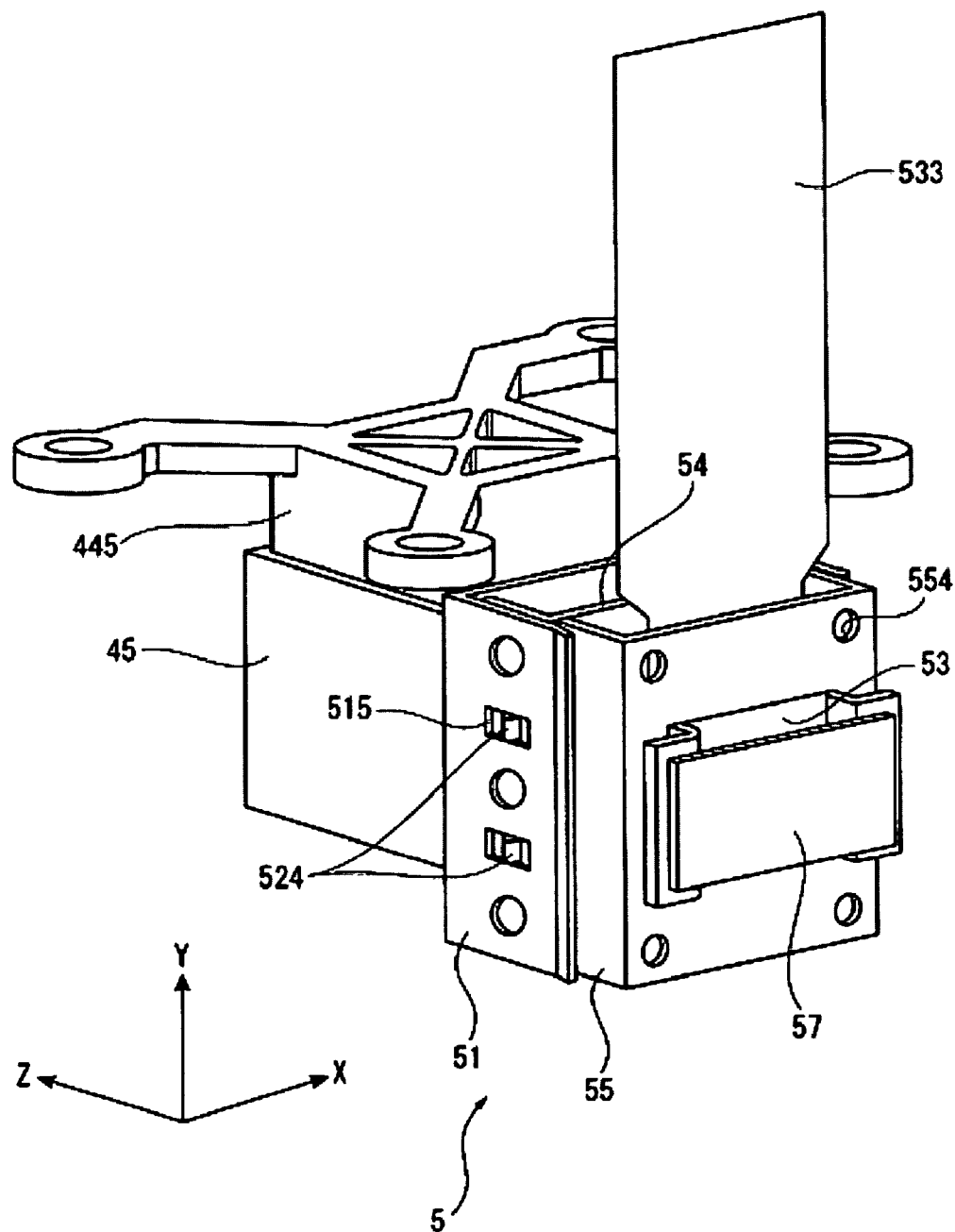
FIG. 2 is a perspective view showing an optical device according to the first embodiment when viewed from the light flux incoming side.
Figure 3:
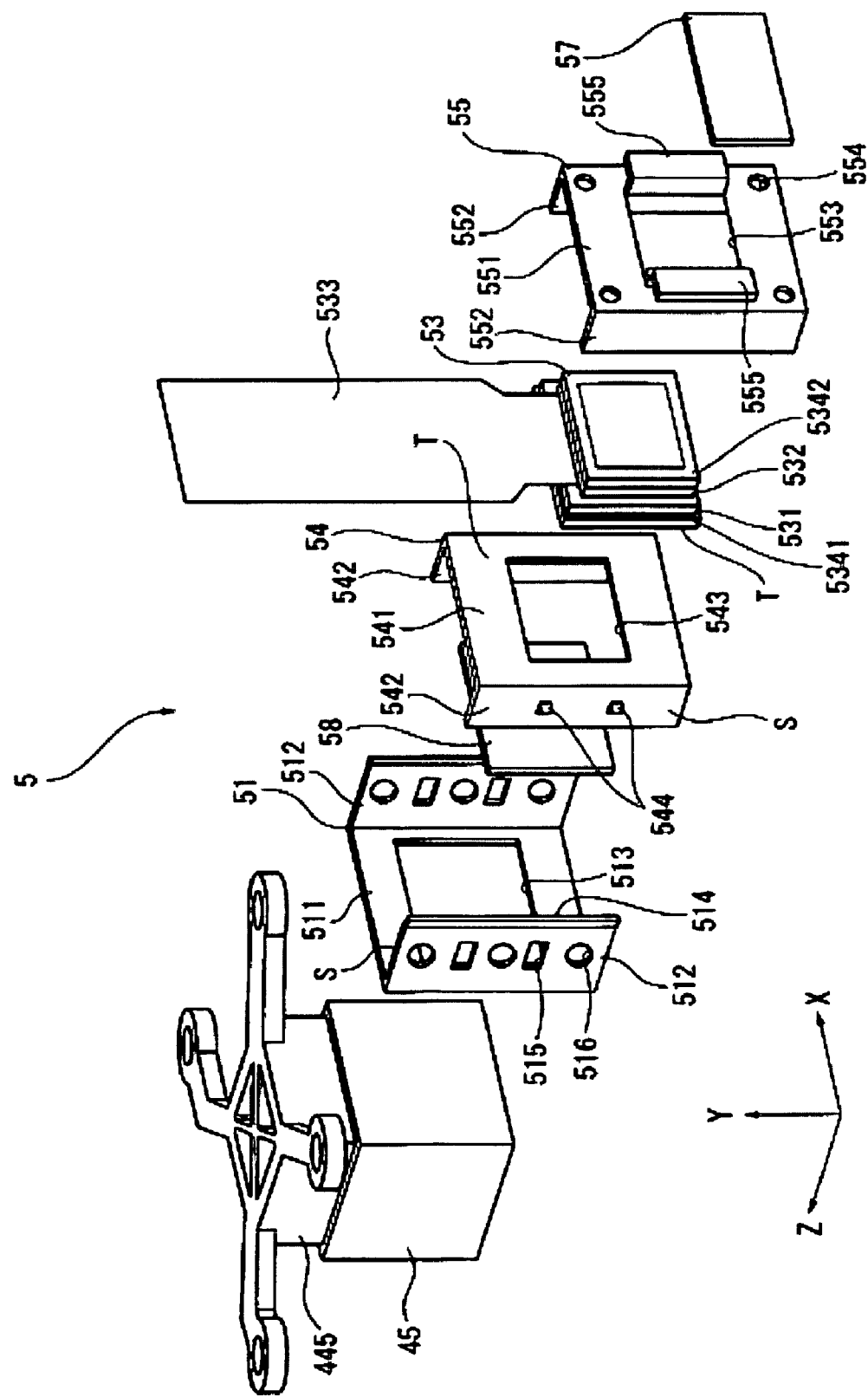
FIG. 3 is an exploded perspective view showing a structure of the optical device according to the first embodiment.

Referring now to FIG. 2 to FIG. 5, a mechanical configuration of the optical device 44 according to this embodiment will be described. FIG. 2 is a perspective view of the optical device 44 when viewed from the rear, and FIG. 3 is an exploded perspective view of the optical device 44. In FIG. 2 and FIG. 3, optical axes of the light flux incoming into the cross dichroic prism 45 is designated as a Z-axis, and two axes orthogonal to the Z-axis are designated as a X-axis (horizontal axis) and a Y-axis (vertical axis) for convenience of description.

As shown in FIG. 2, the optical device 44 includes the cross dichroic prism 45, a base seat 445 fixed to an end surface in the +Y-axis direction (one end surface intersecting with the light flux incoming end surface) of the cross dichroic prism 45, and three optical converting units 5 opposed to the light flux incoming end surface. In order to simplify the drawing, only one of the optical converting units 5 is shown in FIG. 2. The optical converting units 5 are also arranged on other two light flux incoming end surfaces of the cross dichroic prism 45 in a practical sense.

The base seat 445 is fixed to the end surface of the cross dichroic prism 45 in the +Y-axis direction, and the shape of the outer periphery thereof is slightly smaller than the cross dichroic prism 45.

As shown in FIG. 2 and FIG. 3, the optical converting unit 5 includes a fixed member 51 as a first fixed member, a holding member 54 as a second fixed member, the liquid crystal panel 53, and a cover member 55.

The fixed member 51, the holding member 54, and the cover member 55 are formed by applying sheet-metal-processing to a plate-shaped metal plate. The metal may be alloy having a low coefficient of linear expansion such as invar or kovar.

The fixed member 51 supports the entire optical converting unit 5, and is fixed to the light flux incoming end surface of the cross dichroic prism 45. The fixed member 51 is formed into an angular C-shape in cross-section taken along the X-Z plane as shown in FIG. 3, and includes a substrate 511 as a first base portion, and two fixed member upright strips 512 as first upright strips.

The substrate 511 is a rectangular plate extending orthogonally to the optical axis and is formed with an opening 513 for allowing a light flux at a center thereof to transmit therethrough.

The two fixed member upright strips 512 extend upright from both edges of the substrate 511 in the X-axis direction in the −Z-axis direction, respectively. The fixed member upright strips 512 each are provided with a tapered edge 514, elongated holes 515, and filling ports 516.

The tapered edge 514 is formed along an edge at the distal end in the −Z-axis direction of each fixed member upright strip 512, and is tapered as it is widened toward the outside in the X-axis direction as it approaches toward the −Z-axis direction (the direction apart from the other fixed member upright strip 512).

The elongated hole 515 is a substantially rectangular shaped hole penetrated through the fixed member upright strips 512 in the X-axis direction. Two elongated holes 515 are formed side-by-side in the Y-axis direction per one fixed member upright strip 512.

The filling ports 516 are substantially circular holes penetrating through the fixed member upright strip 512 in the X-axis direction. Three filling ports 516 are formed side-by-side in the Y-axis direction per one fixed member upright strip 512, and the above-described elongated holes 515 are formed between two adjacent filling ports 516.

The fixed member 51 is bonded at an end surface of the substrate 511 in the +Z-axis direction to the light flux incoming end surface of the cross dichroic prism 45 when the optical converting unit 5 is assembled.

The holding member 54 is arranged on the side in the −Z-axis direction of the fixed member 51, and holds the liquid crystal panel 53 by an end surface in the −Z-axis direction. The holding member 54 has an angular C-shape along the X-Z cross-sectional plane and includes a substrate 541 as a second base portion, and two holding member upright strips 542 as second upright strips.

The substrate 541 is a rectangular plate extending orthogonally to the optical axis, and is slightly shorter in dimensions in the Y-axis direction and in the X-axis direction in comparison with the substrate 511. The substrate 541 is formed with an opening 543 for allowing the light flux to transmit therethrough at the center thereof. The outgoing-side polarizing plate 58 is bonded to an end surface of the substrate 541 in the +Z-axis direction.

The outgoing-side polarizing plate 58 controls the transmission of the incoming light flux and adjusts the tone of the optical image combined by the cross dichroic prism 45. The outgoing-side polarizing plate 58 must simply be positioned on the side of the liquid crystal panel 53 in the +Z-axis direction, and the bonding position is not limited to this embodiment.

For example, a configuration in which the outgoing-side polarizing plate 58 is bonded to a transparent substrate having a good thermal conductivity such as sapphire, quartz crystal or quartz, and then is bonded to the light flux incoming end surface of the cross dichroic prism 45, and the transparent substrate is mounted to the holding member 54 may also be employed. In this configuration, dissipation of heat generated by the outgoing-side polarizing plate 58 can be improved.

The two holding member upright strips 542 extend upright from both edges of the substrate 541 in the X-axis direction toward the +Z-axis direction, respectively. Two each of locking projections 544 are formed along the Y-axis direction on outer end surfaces of the respective holding member upright strips 542 in the X-axis direction.

The holding member 54 is arranged inside the angular C-shape of the fixed member 51 when the optical converting unit 5 is assembled, and outer end surfaces of the holding member upright strips 542 and inner end surfaces of the fixed member upright strips 512 are bonded to each other.

The holding member 54 holds the liquid crystal panel 53, and reflects returned light reflected from the light flux incoming end surface of the cross dichroic prism 45 by reflecting on the liquid crystal panel 53 on a side of the +Z-axis direction and prevents the returned light from entering into the liquid crystal panel 53.

The liquid crystal panel 53 is bonded to the end surface of the holding member 54 on the −Z-axis direction and to an end surface of the cover member 55 in the +Z-axis direction to modulate the light flux transmitted through the panel according to image information and form the optical image.

The liquid crystal panel 53 includes a drive substrate 531 as a substrate, an opposed substrate 532 as a substrate, a control cable 533, and light-transmitting dustproof panels 5341, 5342, and liquid crystal as an electro-optic substance is encapsulated between the drive substrate 531 and the opposed substrate 532.

The drive substrate 531 and the opposed substrate 532 adjust a voltage between the substrates according to the control signal received from the control cable 533, and changes the direction of the liquid crystal.

Pixel electrodes formed of transparent conductive material such as ITO (IndiumTinOxide), switching elements such as TFT elements corresponding to the respective pixel electrodes, wiring, and an orientation film for aligning the liquid crystal molecules are formed inside the drive substrate 531. Opposed electrodes corresponding to the pixel electrodes and an orientation film extending substantially orthogonal to the orientation film of the drive substrate are formed inside the opposed substrate 532.

The control cable 533 electrically connects the respective electrodes of the drive substrate 531 and the opposed substrate 532, and the control substrate (not shown) of the projector 1.

The light-transmitting dustproof panels 5341, 5342 are secured respectively to light flux transmitting surfaces of the drive substrate 531 and the opposed substrate 532. The light-transmitting dustproof panels 5341, 5342 optically obscure dust attached to the panel surface. Since the light-transmitting dustproof panels 5341, 5342 are formed of thermal conductive material such as sapphire, crystal quartz or quartz, heat generated on the respective substrates 531, 532 is easily absorbed by the light-transmitting dustproof panels 5341, 5342. In other words, the cooling capability of the respective substrates 531, 532 can be improved by the light-transmitting dustproof panels 5341, 5342.

In addition, an end surface of the light-transmitting dustproof panel 5341 in the +Z-axis direction is bonded to a peripheral edge of the opening 543 at the end surface of the substrate 541 in the −Z-axis direction, and an end surface of the light-transmitting dustproof panel 5342 in the −Z-axis direction is bonded to an end surface of a substrate 551 of the cover member 55 described later in the +Z-axis direction. With this bonding, the liquid crystal panel 53 is retained by the respective members 54, 55.

The cover member 55 is arranged on the side of the −Z-axis direction of the liquid crystal panel 53, and holds the liquid crystal panel 53 and the incoming-side polarizing plate 57 and performs light-shielding around the liquid crystal panel 53. The cover member 55 has an angular C-shape along the X-Z cross section, and is provided with the substrate 551, two cover member upright strips 552 and two polarizing plate supporting strips 555 as supporting surfaces.

The substrate 551 is a rectangular plate extending orthogonally to the optical axis and has substantially the same dimension as the substrate 541. The substrate 551 is provided with an opening 553 formed at a center thereof for allowing the light flux to transmit therethrough, and holes 554 formed respectively at four corners so as to penetrate therethrough. The light-transmitting dustproof panel 5342 of the liquid crystal panel 53 is bonded to a peripheral edge of the opening 553 on the end surface of the substrate 551 in the +Z-axis direction.

The two cover member upright strips 552 extend upright from both edges of the substrate 551 in the X-axis direction toward the +Z-axis direction, respectively.

The polarizing plate supporting strips 555 are extended by bending both edges of the opening 553 in the X-axis direction in the −Z-axis direction respectively and then distal ends in the −Z-axis direction are bent outward in the X-axis direction. The incoming-side polarizing plate 57 is bonded to an end surface of the polarizing plate supporting strip 555 in the −Z-axis direction.

The incoming-side polarizing plate 57 transmits only the polarized light in a certain direction out of the incoming light fluxes. Detailed method of installation of the incoming-side polarizing plate 57 will be described later.

Method of Manufacturing Optical Device 44

A method of manufacturing the optical device 44 in this embodiment will be described. A hexaxial adjusting device (FIG. 4), described later and a polarizing plate adjusting unit 8 are used for manufacturing the optical device 44.

(a) The base seat 445 is bonded and fixed to an end surface of the cross dichroic prism 45 in the Y-axis direction. Silicon system adhesive agent can be used as adhesive agent for bonding and fixing.

(b) The holding member 54 is fitted to the inside of the angular C-shape of the fixed member 51, and the locking projections 544 are engaged with the elongated holes 515 of the fixed member upright strips 512. Then, UV cured adhesive agent is filled to abutment surfaces (bonding surfaces S) of the fixed member upright strips 512 and the holding member upright strips 542 via the filling ports 516.

(c) The end surface of the substrate 511 of the fixed member 51 in the +Z-axis direction is bonded and fixed to the light flux incoming end surface of the cross dichroic prism 45 with the UV cured adhesive agent.

(d) The liquid crystal panel 53 is bonded and fixed to the end surface of the substrate 551 of the cover member 55 in the +Z-axis direction.

(e) The cover member 55 and the polarizing plate 58 are held by a hexaxial adjusting device 7.

(f) The polarizing plate adjusting unit 8 is operated to adjust the position of the polarizing plate 57 with respect to the liquid crystal panel 53, and the polarizing plate 57 is bonded and fixed to the polarizing plate supporting strip 555 of the cover member 55.

(g) The cover member 55 is moved by the hexaxial adjusting device 7 and the cover member 55 is arranged on the side of the holding member 54 in the −Z-axis direction (rough alignment focus adjustment) so that the liquid crystal panel 53 is arranged at a design position with respect to the cross dichroic prism 45.

(h) The holding member 54 is moved in the −Z-axis direction by air blow, and an end surface of the substrate 541 in the −Z-axis direction is brought into abutment with an end surface of the liquid crystal panel 53 in the +Z-axis direction via the UV cured adhesive agent (a bonding surface T).

(i) The light flux is entered into the liquid crystal panel 53 from the hexaxial adjusting device 7, and the relative position between the liquid crystal panels 53 is adjusted while confirming the light flux emitted from the cross dichroic prism 45 to match the pixels of the respective optical images combined by the cross dichroic prism 45 (fine alignment adjustment). More specifically, the liquid crystal panel 53 is finely moved in the X-axis direction, the Y-axis direction, and the Zθ-axis direction (about the Z-axis) with respect to the holding member 54 with the bonding surface T as a sliding surface.

(j) The light flux is entered into the liquid crystal panel 53 from the hexaxial adjusting device 7, and the liquid crystal panel 53 is arranged at a back-focus of the projecting lens 46 (FIG. 1) (fine focus adjustment) while confirming the light flux emitted from the cross dichroic prism 45. More specifically, the holding member 54 is finely moved in the Z-axis direction, the Xθ direction (about the X-axis), the Yθ direction (about the Y-axis) with respect to the fixed member 51.

(k) UV rays are irradiated to the bonding surfaces S, T by the hexaxial adjusting device 7 to cure the UV cured adhesive agent. Accordingly, the respective members 445, 51, 54 are fixed to each other by the respective bonding surfaces S, T.

(l) The cover member 55 is dismounted from the hexaxial adjusting device 7.

Figure 5:
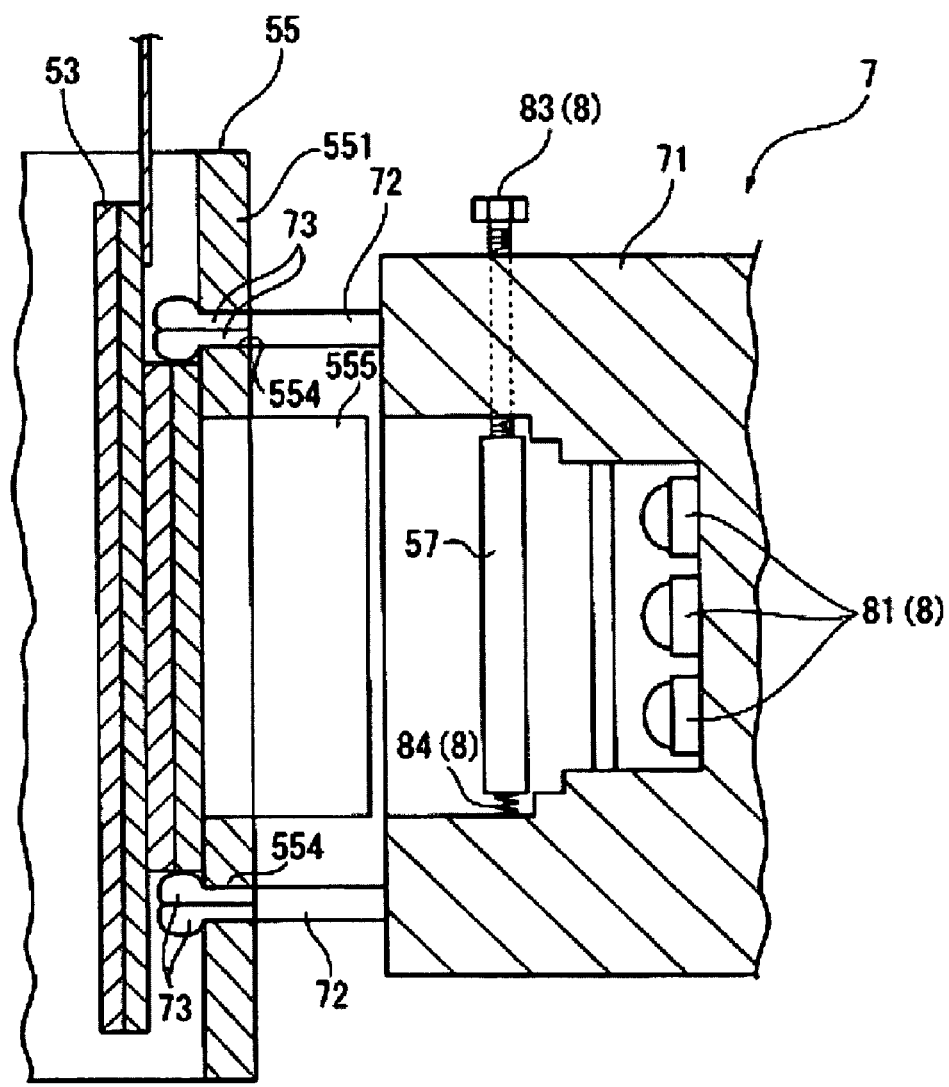
FIG. 5 is a perspective cross-sectional view showing a liquid crystal panel holding structure of a hexaxial adjusting device according to the first embodiment.

Referring now to FIG. 4 and FIG. 5, the procedures (e) to (g) and (l) will be described in detail.

FIG. 4 is a pattern diagram of the polarizing plate adjusting unit 8 viewed from the +Z-axis direction. FIG. 5 is a pattern cross-sectional view of a distal end portion of the hexaxial adjusting device 7 when viewed in the +X-axis direction.

In FIG. 4 and FIG. 5, the optical axis of the light flux incoming into the cross dichroic prism 45 (FIG. 3) are designated as the Z-axis, the two axes orthogonal to the Z-axis are designated as the X-axis (horizontal axis) and the Y-axis (vertical axis) as in FIG. 2 and FIG. 3.

As shown in FIG. 4 and FIG. 5, an end surface of an optical element holding unit 71 of the hexaxial adjusting device 7 in the +Z-axis direction is formed with four cylindrical pins 72 extending in the +Z-axis direction, and the polarizing plate adjusting unit 8. The pins 72 are arranged at positions corresponding to the positions where the holes 554 of the cover member 55 are formed.

In the procedure (e), the incoming-side polarizing plate 57 is held in the recess formed on the optical element holding unit 71. Then, distal ends of the pins 72 are brought into abutment with the holes 554 on an end surface of the cover member 55 in the −Z-axis direction respectively. The liquid crystal panel 53 is already bonded to the cover member 55 in the procedure (d).

In the cylinder of the pin 72, there are two chucks 73 which have a swelling property. After the distal ends of the pins 72 are brought into abutment with the holes 554 of the cover member 55, the chucks 73 are delivered from the distal end of the pin 72 in the +Z-axis direction.

Then, distal ends of the chucks 73 project through the hole 554 toward the side of an end surface of the substrate 551 in the +Z-axis direction. The distal ends of the chucks 73 are swelled into a spherical shape, and support the end surface of the substrate 551 in the +Z-axis direction. In this manner, the cover member 55 is held by the optical element holding unit 71 of the hexaxial adjusting device 7.

Subsequently, in the procedure (f), the light flux is emitted from a light flux irradiating unit 81 of the polarizing plate adjusting unit 8, and is caused to transmit through the incoming-side polarizing plate 57 and the liquid crystal panel 53. Then, an adjusting screw 83 is adjusted while observing the light flux emitted from the liquid crystal panel 53. A distal end of the adjusting screw 83 abuts against an end surface of the incoming-side polarizing plate 57, and a spring 84 expands and contracts in the Y-axis direction according to the adjustment of the adjusting screw 83. In this manner, by adjusting the adjusting screw 83, the incoming-side polarizing plate 57 is slightly turned in the Zθ direction about a center portion thereof (about the Z-axis).

When the adequate emitted light flux is obtained, an end surface of the incoming-side polarizing plate 57 in the +Z-axis direction is bonded and fixed to the polarizing plate supporting strip 555. Then, the incoming-side polarizing plate 57 can be installed to the polarizing plate supporting strip 555 in an adequate posture.

Subsequently, in the procedure (g), the hexaxial adjusting device 7 is operated with the cover member 55 being held, so that the cover member 55 is arranged at a designed position with respect to the cross dichroic prism 45 and the members 51, 54.

In the procedure (1), when the respective members 51 to 54 are bonded and fixed by irradiating UV rays, the hexaxial adjusting device 7 retracts the chucks 73 into the pin 72, and pulls the chucks 73 out from the hole 554. In this manner, the cover member 55 can be dismounted from the hexaxial adjusting device 7.

In this manner, since the cover member 55 is held by the hexaxial adjusting device 7 via the chucks 73, the configuration can be simplified in comparison with the hexaxial adjusting device which holds the cover member 55 by gripping or adsorption, and the liquid crystal panel can be held stably. In addition, when the holes corresponding to the pins 72 are formed on the respective members, the configuration of the optical element holding unit 71 can be commonly used for the different members.

According to this embodiment, since the fixed member upright strips 512 and the holding member upright strips 542 are assembled so as to slide with respect to each other, the fixed member 51 and the holding member 54 can be assembled reliably. In other words, since abutment surfaces of the fixed member 51 and the holding member 54 are larger in comparison with the related art, displacement of both members 51, 54 at the abutment surfaces of both upright strips 512, 542 can be prevented. Therefore, displacement of the liquid crystal panel 53 from the back-focus position and displacement of pixels between the liquid crystal panels 53 can be prevented.

In addition, since the sheet metal material is a material having a low coefficient of linear expansion such as invar or kovar, displacement of the liquid crystal panel 53 from the back-focus position due to heat or displacement of the pixels between the liquid crystal panels 53 can be prevented.

The liquid crystal panel 53 is not provided with a frame member or the like to be fitted around the liquid crystal panel 53, and is supported by being directly mounted to the holding member 54. Accordingly, wind can easily hit on the liquid crystal panel 53, and hence the cooling capability of the liquid crystal panel 53 can be improved.

In addition, since the liquid crystal panel 53 is not provided with the frame member or the like, simplification of the configuration of the optical device 44, reduction of the number of components, reduction of the cost, and reduction of the weight can be achieved.

Since the fixed member 51, the holding member 54 and the cover member 55 are formed by performing sheet-metal-processing onto the plate-shaped metal plate, they can be formed easily. In addition, since the liquid crystal panel 53 is directly mounted to the holding member 54 and the cover member 55, heat generated in the liquid crystal panel 53 can easily be transferred to the metallic holding member 54. Therefore, the cooling capability of the liquid crystal panel 53 can be improved.

Since the liquid crystal panel 53 can be mounted to the side of the holding member 54 in the −Z-axis direction, a space around the outgoing-side polarizing plate 58 arranged between the fixed member 51 and the holding member 54 can be widened. Therefore, the cooling capability of the outgoing-side polarizing plate 58 can be improved.

By arranging the holding member 54 on the light flux outgoing side of the liquid crystal panel 53, returned light reflected from the light flux incoming end surface of the cross dichroic prism 45 can be reflected by the light flux outgoing side of the liquid crystal panel 53 to prevent the returned light from entering into the liquid crystal panel 53.

When light other than the color light, for example, light leaked from the light source lamp 411, natural light, or the like is entered into the liquid crystal panel 53, the quality of the optical image formed on the liquid crystal panel 53 may be impaired. In contrast, according to this embodiment, by providing the cover member 55 on the side of the liquid crystal panel 53 in the −Z-axis direction, the light other than the color light can be prevented from entering into the liquid crystal panel 53, and hence the quality of the optical image formed on the liquid crystal panel 53 can be maintained.

Since the incoming-side polarizing plate 57 is integrally provided on the optical device 44, it is not necessary to provide the configuration for mounting the incoming-side polarizing plate 57 on the housing of the projector 1. Since the polarizing plate adjusting unit 8 is provided on the hexaxial adjusting device 7, the adjusting mechanism of the incoming-side polarizing plate 57 in the optical device 44 can be omitted. Therefore, downsizing and simplification of the configuration of the projector 1 can be achieved.

Since the incoming-side polarizing plate 57 is provided integrally with the optical device 44, the mutual positional adjustment between the liquid crystal panel 53 and the incoming-side polarizing plate 57 can be avoided when adjusting the optical axis of the light flux emitted from the light source lamp 411 after the optical unit 4 is installed.

When positioning the liquid crystal panel 53, the fixed member 51 and the holding member 54 are not separated and disconnected from each other since the locking projections 544 are supported by the elongated holes 515 only by inserting the locking projections 544 into the elongated holes 515. Accordingly, the assembly of the fixed member 51 and the holding member 54 can be performed easily.

According to this embodiment, since the optical device 44 has the effects and advantages as described above, the projector 1 can have the same effects and advantages.

Second Embodiment

Figure 6:
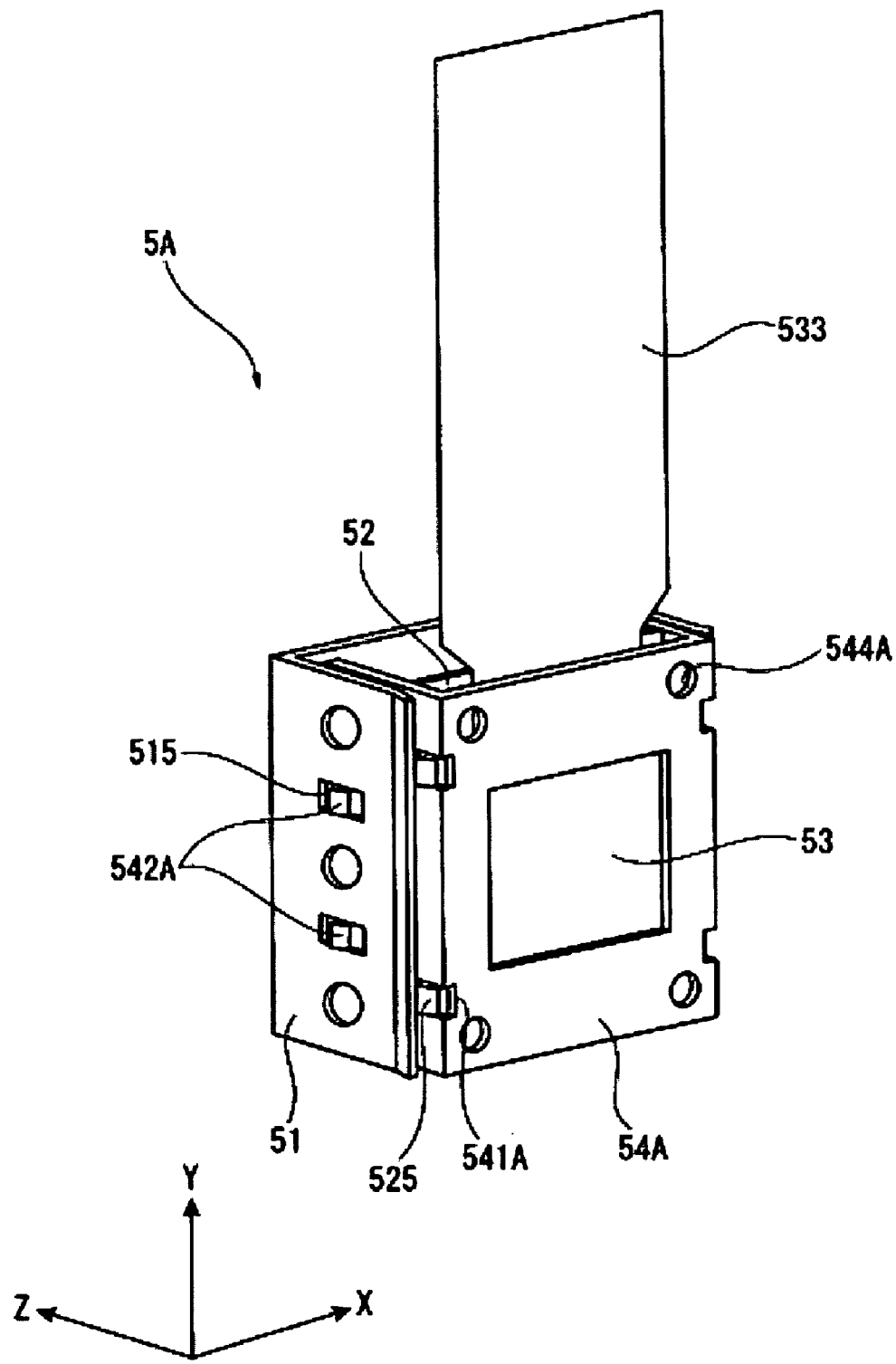
FIG. 6 is a perspective view showing an optical device according to a second embodiment when viewed from the light flux incoming side.
Figure 7:
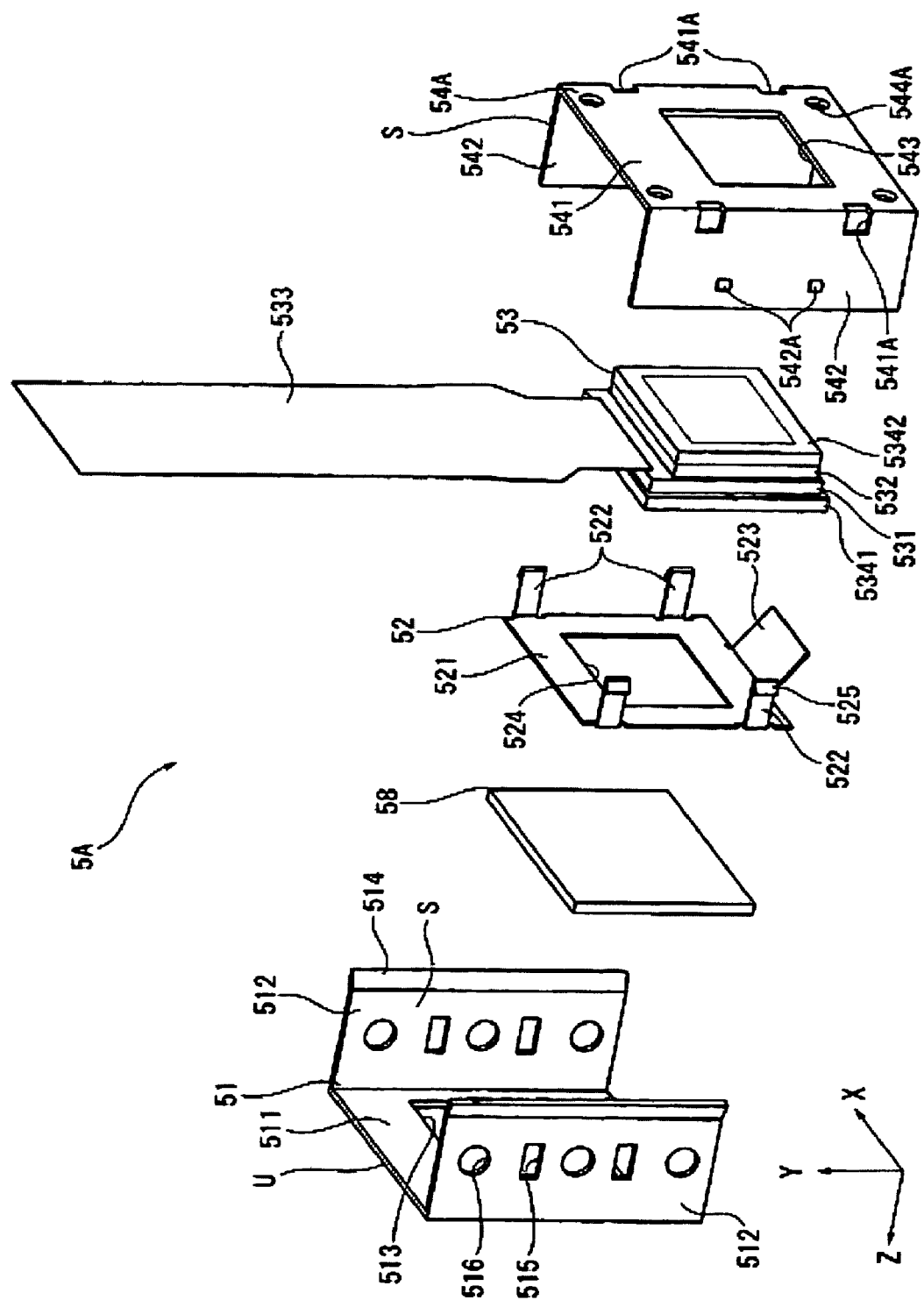
FIG. 7 is an exploded perspective view showing a structure of the optical device according to the second embodiment.

Referring now to FIG. 6 and FIG. 7, a second embodiment will be described. FIG. 6 is a perspective view of an optical converting unit 5A according to the second embodiment when viewed from obliquely rear, and FIG. 7 is an exploded perspective view of the optical converting unit 5A.

In FIG. 6 and FIG. 7, the optical axis of the light flux incoming into the cross dichroic prism 45 (FIG. 3) are designated as the Z-axis, the two axes orthogonal to the Z-axis are designated as the X-axis (horizontal axis) and the Y-axis (vertical axis) as in FIG. 2 and FIG. 3.

In comparison with the first embodiment, the second embodiment is different in configuration of the optical converting unit 5A. More specifically, configurations of a shielding member 52 and a holding member 54A, and a point in which the liquid crystal panel 53 can be bonded to an end surface of the holding member 54A in the +Z-axis direction.

The optical converting unit 5A in the second embodiment is provided with the fixed member 51, the shielding member 52, the liquid crystal panel 53, and the holding member 54A, as shown in FIG. 6 and FIG. 7.

Out of these members, the shielding member 52 includes a substrate 521, four locking strips 522, and a holding strip 523.

The substrate 521 is a rectangular plate extending orthogonally to the optical axis, and is formed with an opening 524 for allowing the light flux to transmit therethrough at a center thereof. The substrate 521 is slightly shorter in dimensions in the Y-axis direction and in the X-axis direction in comparison with the substrate 541. The outgoing-side polarizing plate 58 is bonded to an end surface of the substrate 521 in the +Z-axis direction.

Two each of the locking strips 522 are provided at both edges of the substrate 521 in the X-axis direction, and are shaft shaped members extending from the substrate 521 in the −Z-axis direction. Distal end portions of the locking strips 522 are bent outwardly in the X-axis direction, and claw portions 525 are formed thereon.

The holding strip 523 is extended from an edge of the substrate 521 in the −Y-axis direction obliquely toward the −Y-axis direction and the −Z-axis direction.

The shielding member 52 is arranged inside an angular C-shape of the holding member 54A described later when the optical converting unit 5A is assembled. The shielding member 52 reflects returned light reflected from the light flux incoming end surface of the cross dichroic prism 45 on the side of the liquid crystal panel 53 in the +Z-axis direction to prevent the returned light from entering into the liquid crystal panel 53.

The holding member 54A has an angular C-shape in cross section along the X-Z plane, and is provided with a substrate 541, holding member upright strips 542 and four engaging holes 541A.

The substrate 541 is formed with holes 544A at four corners so as to penetrate therethrough in the Z-axis direction. The chucks 73 of the hexaxial adjusting device 7 (FIG. 5) are inserted into the holes 544A at the time of manufacturing the optical device 44, whereby the holding member 54A is held by the hexaxial adjusting device 7 (FIG. 5).

A light-transmitting dustproof panel 5342 of the liquid crystal panel 53 is bonded to an end surface of the substrate 541 in the +Z-axis direction. Accordingly, the liquid crystal panel 53 is held by the holding member 54A.

The holding member upright strip 542 is slightly longer in dimension in the Z-axis direction in comparison with the first embodiment. Outer end surfaces of the holding member upright strips 542 in the X-axis direction are formed with two each of locking projections 542A along the Y-axis direction.

Two each of the engaging holes 541A are formed on edges of the respective holding member upright strips 542 in the −Z-axis direction along the Y-axis direction. The engaging holes 541A are partly extended to edges of the substrate 541 in the X-axis direction. The claw portions 525 of the locking strips 522 are locked with the engaging holes 541A when the optical converting unit 5A is assembled. Accordingly, the shielding member 52 is held on the side of the liquid crystal panel 53 in the +Z-axis direction inside the angular C-shape of the holding member 54A.

Method of Manufacturing Optical Device 44

Referring now to FIG. 6 and FIG. 7, a method of manufacturing the optical device 44 according to the second embodiment will be described. (a-A) The base seat 445 (FIG. 3) is bonded and fixed to the end surface of the cross dichroic prism 45 (FIG. 3) in the Y-axis direction.

(b-A) An end surface of the liquid crystal panel 53 in the −Z-axis direction is bonded and fixed to an end surface of the substrate 541 of the holding member 54A in the +Z-axis direction.

(c-A) The claw portions 525 of the respective locking strips 522 of the shielding member 52 are locked with the respective engaging holes 541A of the holding member 54A, and the shielding member 52 is fitted inside the angular C-shape of the holding member 54A.

(d-A) The holding member 54A is fitted inside the angular C-shape of the fixed member 51, and the locking projections 542A are engaged with the elongated holes 515 of the fixed member upright strips 512. Then, UV cured adhesive agent is filled into the abutment surfaces (bonding surfaces S) of the fixed member upright strip 512 and the holding member upright strip 542.

(e-A) The chucks 73 of the hexaxial adjusting device (FIG. 5) are inserted into the holes 544A of the holding member 54A to cause the hexaxial adjusting device to hold the members 51 to 54A.

(f-A) An end surface of the substrate 511 of the fixed member 51 is brought into abutment with the light flux incoming end surface of the cross dichroic prism 45 via UV cured adhesive agent (a bonding surface U).

(g-A) The hexaxial adjusting device 7 is operated and the members 51 to 54A are slightly moved in the X-axis direction, the Y-axis direction, and the Zθ direction (about the Z-axis) with respect to the base seat 445 with the bonding surface U as the sliding surface to fine-adjust the alignment.

(h-A) The hexaxial adjusting device 7 is operated and the holding member 54A is slightly moved in the Z-axis direction, the Xθ direction (about the X-axis) with respect to the fixed member 51 with the bonding surface S as the sliding surface to fine-adjust the focus.

(i-A) UV rays are irradiated to the respective bonding surfaces S, U by the hexaxial adjusting device 7 to cure the UV cured adhesive agent. Accordingly, the respective members 445, 51 and 54A are fixed to each other via the bonding surfaces S, U.

(j-A) The holding member 54A is dismounted from the hexaxial adjusting device 7.

According to this embodiment, since the holding member 54A is arranged on the side of the liquid crystal panel 53 in the −Z-axis direction, the holding member 54A can prevent light other than the color light from entering into the liquid crystal panel 53, and hence the quality of the optical image formed by the liquid crystal panel 53 can be maintained.

In addition, the liquid crystal panel 53 is arranged in a cylindrical space formed between the fixed member 51 and the holding member 54A. Since the space has a cylindrical shape in this manner, desirable air ventilation is secured around the liquid crystal panel 53 and hence the cooling capability of the liquid crystal panel 53 can be improved.

By arranging the shielding member 52 on the side of the liquid crystal panel 53 in the +Z-axis direction, the returned light reflected from the light flux incoming end surface of the cross dichroic prism 45 is reflected on the side of the liquid crystal panel 53 in the +Z-axis direction to prevent the returned light from entering into the liquid crystal panel 53.

The shielding member 52 can be formed easily because it is formed by performing sheet-metal-processing on a plate-shaped metal plate.

It is also possible to arrange the shielding member so as to abut against the liquid crystal panel 53. Accordingly, heat generated by the liquid crystal panel 53 is transferred to the metallic shielding member 52, and the cooling capability of the liquid crystal panel 53 can be improved.

Since an optical converting unit 5B can be held by the hexaxial adjusting device 7 (FIG. 5) by inserting the chucks 73 into the holes 544A of the holding member 54A at the time of manufacturing of the optical device 44, inspection and manufacture of the optical device 44 can be facilitated.

Third Embodiment

Figure 8:
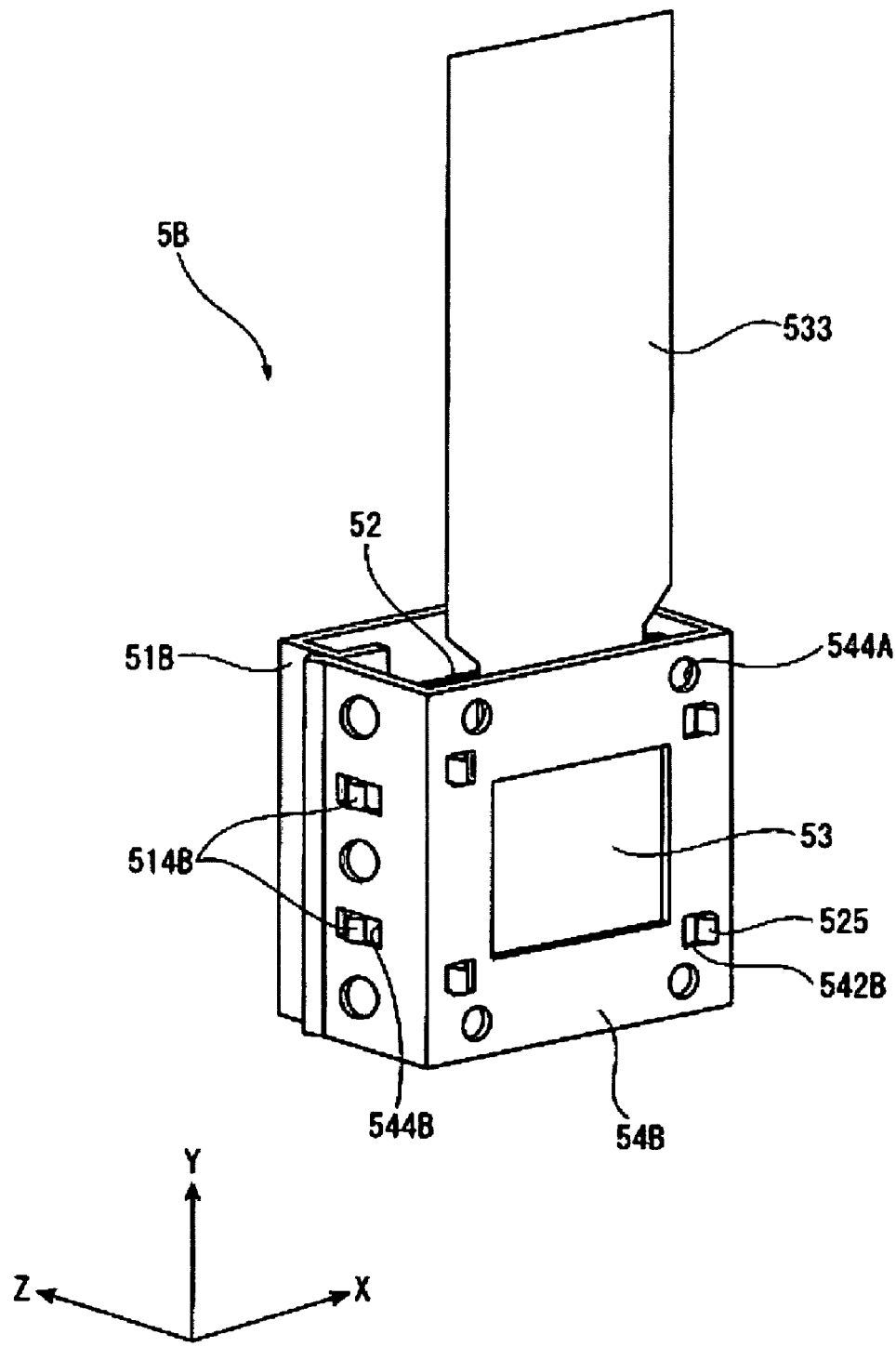
FIG. 8 is a perspective view of an optical device according to a third embodiment when viewed from the light flux incoming side.
Figure 9:
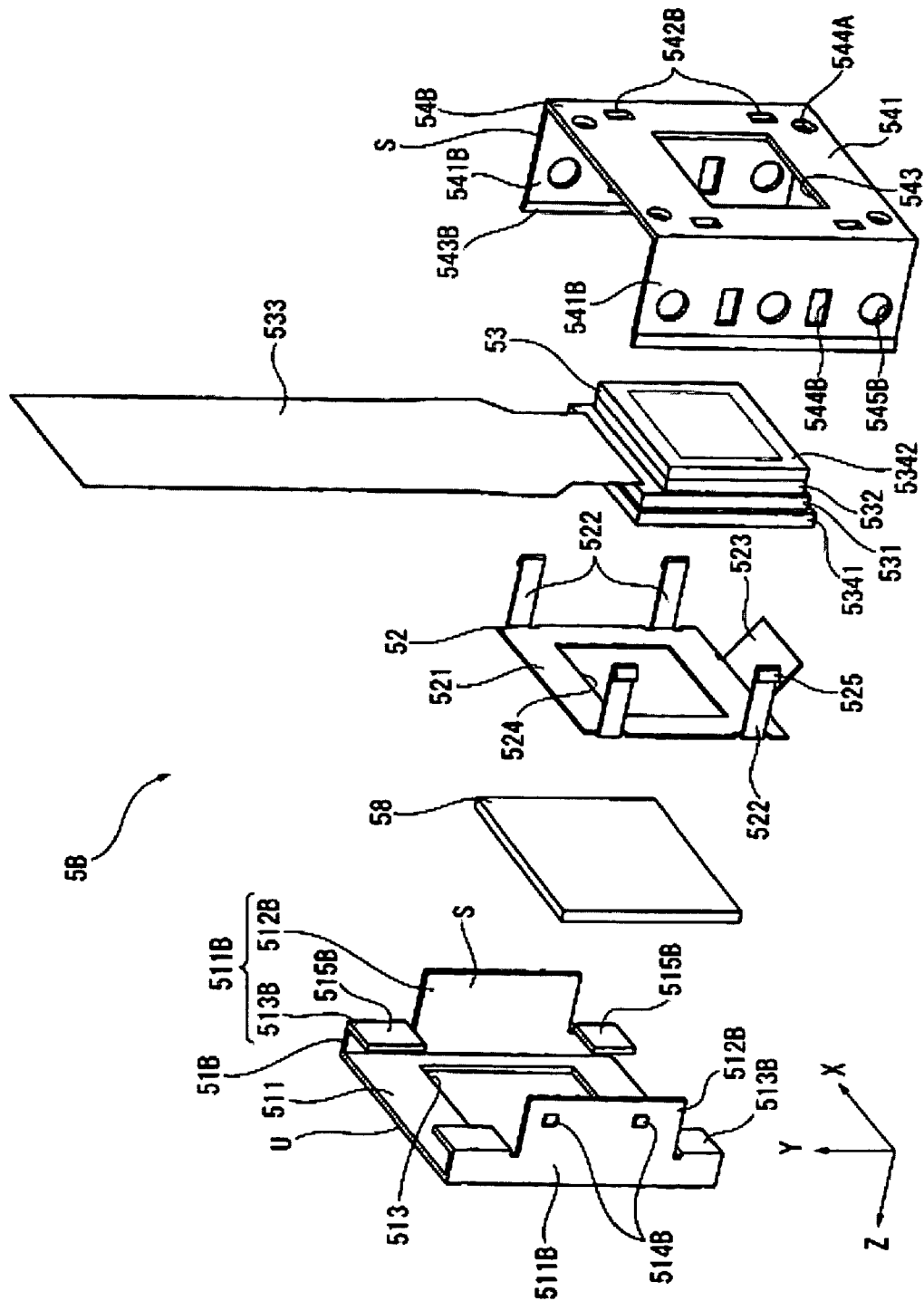
FIG. 9 is an exploded perspective view showing a structure of the optical device according to the third embodiment.

Referring now to FIG. 8 and FIG. 9, a third embodiment will be described. FIG. 8 is a perspective view of the optical converting unit 5B according to the third embodiment when viewed obliquely from the rear, and FIG. 9 is an exploded perspective view of the optical converting unit 5B.

In FIG. 8 and FIG. 9, the optical axis of the light flux incoming into the cross dichroic prism 45 (FIG. 3) are designated as the Z-axis, the two axes orthogonal to the Z-axis are designated as the X-axis (horizontal axis) and the Y-axis (vertical axis) as in FIG. 2 and FIG. 3.

The third embodiment is different in configuration of the optical converting unit 5B in comparison with the first embodiment. More specifically, the configurations of a fixed member 51B, the shielding member 52 and a holding member 54B, and a point in which the liquid crystal panel 53 is bonded to an end surface of the holding member 54B in the +Z-axis direction. The shielding member 52 has the same configuration as the shielding member 52 in the second embodiment.

The optical converting unit 5B according to the third embodiment includes the fixed member 51B, the shielding member 52, the liquid crystal panel 53, and the holding member 54B as shown in FIG. 8 and FIG. 9.

The fixed member 51B has the angular C-shape in cross section along the X-Z plane, and includes the substrate 511, and two side surface portions 511B.

The two side surface portions 511B extend upright from both edges of the substrate 511 in the X-axis direction toward the −Z-axis direction, respectively. The side surface portions 511B are provided with fixed member upright strips 512B and two bent strips 513B.

The fixed member upright strip 512B is configured in such a manner that a center portion of the side surface portion 511B in the Y-axis direction extends in the −Z-axis direction. Outer end surfaces of each fixed member upright strips 512B in the X-axis direction are formed with two each of locking projections 514B along the Y-axis direction.

The bent strips 513B are formed by bending both end portions of the side surface portions 511B in the Y-axis direction inwardly in the X-axis direction at a right angle. By this bending, the bent strips 513B define adhering surfaces 515B extending substantially in parallel with the X-Y plane. The outgoing-side polarizing plate 58 is bonded to these four adhering surfaces 515B.

The holding member 54B has the angular C-shape in cross section along the X-Z plane, and includes the substrate 541 and two holding member upright strips 541B.

Both edges of the substrate 541 in the X-axis direction are formed with two each of engaging holes 542B respectively along the Y-axis direction. These engaging holes 542B have a rectangular shape elongated in the Y-axis direction. The locking strips 522 are locked with the engaging holes 542B when the optical converting unit 5B is assembled. Accordingly, the shielding member 52 is held inside the angular C-shape of the holding member 54B. The light-transmitting dustproof panel 5342 of the liquid crystal panel 53 is bonded and fixed to an end surface of the substrate 541 in the −Z-axis direction.

The holding member upright strips 541B extend upright from both edges of the substrate 541 in the X-axis direction toward the +Z-axis direction, respectively. The holding member upright strip 541B is provided with a tapered edge 543B, elongated holes 544B, and filling ports 545B.

The tapered edges 543B are formed along side edges of the respective holding member upright strips 541B in the −Z-axis direction, and have a tapered shape widened toward the outside in the X-axis direction as it approaches toward the −Z-axis direction.

The elongated hole 544B is a substantially rectangular hole penetrating through the holding member upright strips 541B in the X-axis direction. The two elongated holes 544B are formed side-by-side in the Y-axis direction for each holding member upright strip 541B.

The filling ports 545B are substantially circular holes penetrating through the holding member upright strips 541B in the X-axis direction. Three each of the filling ports 545B are formed side-by-side in the Y-axis direction for each holding member upright strip 541B, and the above-described elongated holes 544B are formed between the adjacent filling ports 545B.

When the optical converting unit 5B is assembled, the fixed member 51B is arranged inside the angular C-shape of the holding member 54B, and an inner end surface of the holding member upright strip 541B and the outer end surface of the fixed member upright strip 512B are bonded.

The optical device 44 in this embodiment is manufactured in the same procedure as the second embodiment. In addition, as in the second embodiment, the focus adjustment is performed on the bonding surface S and the alignment adjustment is performed on the bonding surface U. The outgoing-side polarizing plate 58 is adhered in advance to the adhering surfaces 515B of the fixed member 51B. According to the configuration of the optical device 44, the same effects and advantages as the second embodiment will be achieved.

Fourth Embodiment

Figure 10:
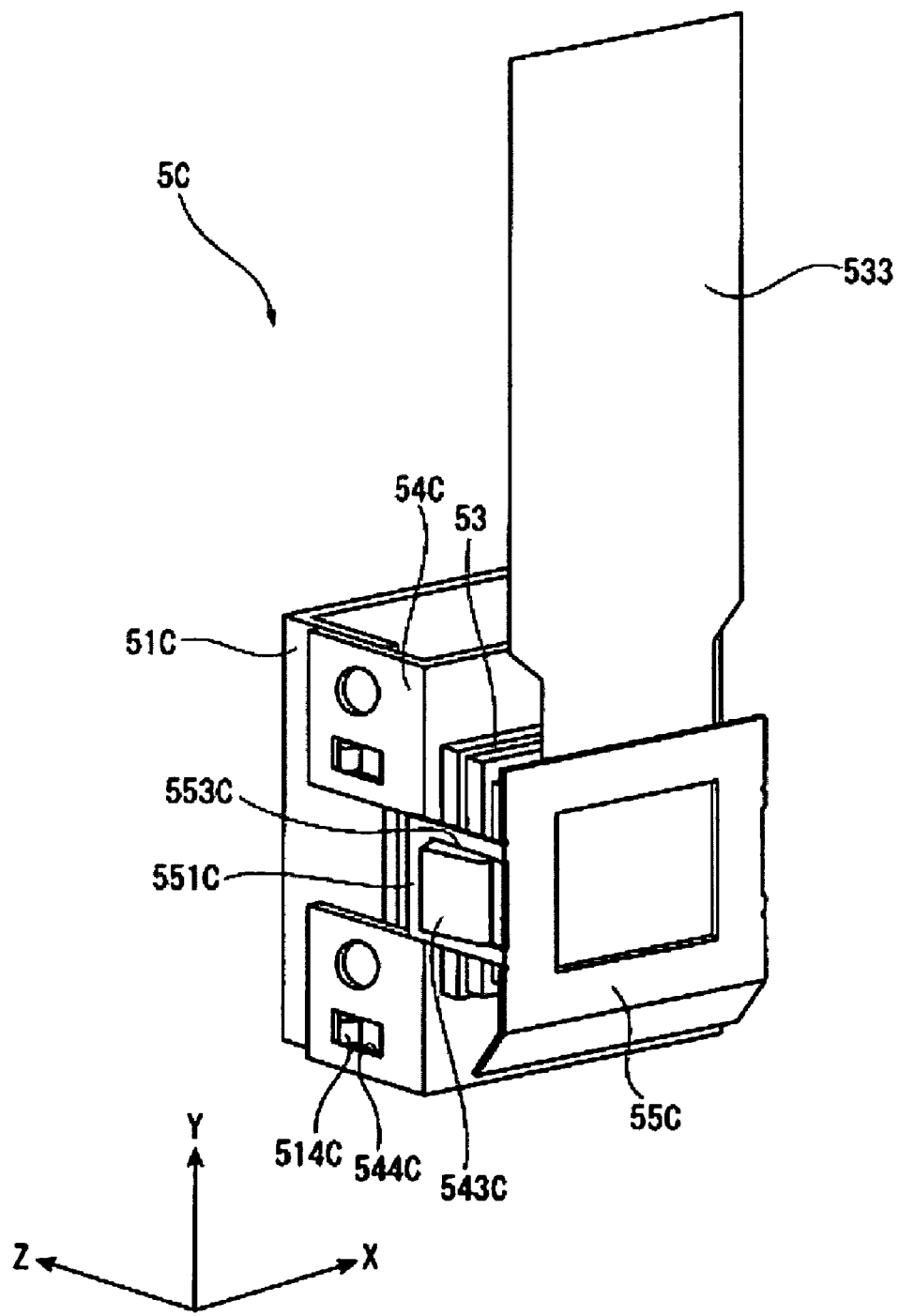
FIG. 10 is a perspective view of an optical device according to a fourth embodiment of the when viewed from the light flux incoming side.
Figure 11:
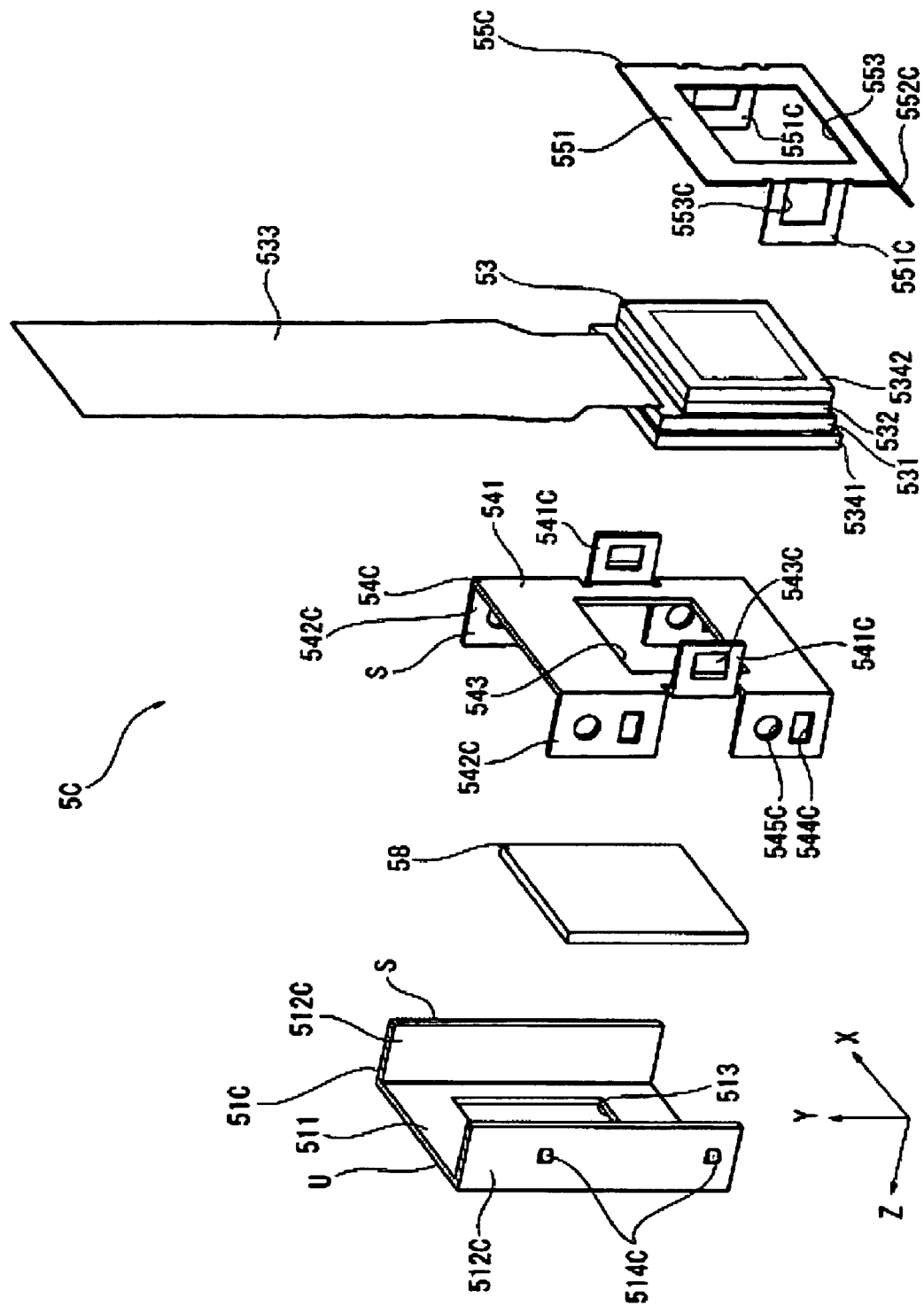
FIG. 11 is an exploded perspective view showing a structure of the optical device according to the fourth embodiment.

Referring now to FIG. 10 and FIG. 11, a fourth embodiment will be described. FIG. 10 is a perspective view of an optical converting unit 5C according to the fourth embodiment viewed obliquely from the rear, and FIG. 11 is an exploded perspective view of the optical converting unit 5C.

In FIG. 10 and FIG. 11, the optical axis of the light flux incoming into the cross dichroic prism 45 (FIG. 3) are designated as the Z-axis, the two axes orthogonal to the Z-axis are designated as the X-axis (horizontal axis) and the Y-axis (vertical axis) as in FIG. 2 and FIG. 3.

The fourth embodiment is different in configuration of the optical converting unit 5C in comparison with the first embodiment. More specifically, the configurations of a holding member 54C and a cover member 55C are different.

The optical converting unit 5C in the fourth embodiment includes a fixed member 51C, a holding member 54C the liquid crystal panel 53, and the cover member 55C as shown in FIG. 10 and FIG. 11.

The fixed member 51C has the angular C-shape in cross section along the X-Z plane, and includes the substrate 511 and two fixed member upright strips 512C.

The outgoing-side polarizing plate 58 is adhered to an end surface of the substrate 511 in the −Z-axis direction.

The two fixed member upright strips 512C extend upward from both edges of the substrate 511 in the X-axis direction toward the −Z-axis direction respectively. Outer end surfaces of the respective fixed member upright strips 512C in the X-axis direction are formed with two each of locking projections 514C along the Y-axis direction.

The holding member 54C has the angular C-shape in cross section along the X-Z plane, and includes the substrate 541, holding member oppositely upright strips 541C, and holding member upright strips 542C.

The light-transmitting dustproof panel 5341 of the liquid crystal panel 53 is bonded to a peripheral edge of the opening 543 of an end surface of the substrate 541 in the −Z-axis direction.

The holding member oppositely upright strips 541C extend upright in the Y-axis direction from a center portion of both edges of the substrate 541 in the X-axis direction respectively toward the −Z-axis direction. The respective holding member oppositely upright strips 541C are provided with locking projections 543C.

The locking projections 543C project from an outer end surface of the holding member oppositely upright strip 541C in the x-axis direction outward in the X-axis direction. Outer end surfaces of the locking projections 543C in the X-axis direction are an inclined surface inclined inwardly in the X-axis direction as it approaches in the −Z-axis direction.

The holding member upright strips 542C extend upright from both end portions in the Y-axis direction at both edges in the X-axis direction of the substrate 541 toward the +Z-axis direction, respectively. The respective holding member upright strips 542C include elongated holes 544C and filling ports 545C.

The elongated holes 544C are substantially rectangular holes penetrating through the holding member upright strip 542C in the X-axis direction and formed one each on the holding member upright strips 542C at an end portion in the +Y-axis direction. The locking projections 514C of the fixed member 51C are engaged with the elongated holes 544C.

The filling ports 545C are substantially circular ports penetrating through the holding member upright strips 542C in the X-axis direction, and are formed one on each holding member upright strip 542C at an end portion in the −Y-axis direction.

When the optical converting unit 5C is assembled, the fixed member 51C is arranged inside the angular C-shape of the holding member 54C and inner end surfaces of the holding member upright strips 542C and the outer end surfaces of the fixed member upright strips 512C are bonded (bonding surface S).

The cover member 55C has an angular C-shape in cross section along the X-Z plane and includes the substrate 551, cover member upright strips 551C and a holding strip 552C. The cover member 55C is significantly different from the cover member 55 in the first embodiment in that the polarizing plate supporting strips 555 (FIG. 3) are not provided. In this embodiment, the incoming-side polarizing plate is mounted to the housing for the optical component.

The cover member upright strips 551C extend upright from both edges of the substrate 551 in the X-axis direction at centers thereof in the Y-axis direction respectively in the +Z-axis direction. The respective cover member upright strips 551C are formed with rectangular engaging openings 553C penetrating therethrough in the X-axis direction. The locking projections 543C are locked with the engaging openings 553C. With this locking, the cover member 55C is held by the holding member 54C.

The holding strip 552C extends obliquely downward from an edge of the substrate 551 in the −Y-axis direction toward the side in the +Z-axis direction.

In the optical converting unit 5C of this embodiment, the focus adjustment is performed on the bonding surface S, and the alignment adjustment is performed on the bonding surface U. According to the configuration of the optical device 44 in this configuration, the same effects and advantages as the first embodiment can be achieved.

MODIFICATION OF THE EMBODIMENTS SHOWN ABOVE

Although the best mode for carrying out the disclosure and the like is described in the description above, it is not intended to limit the disclosure. In other words, since the embodiments described above are not intended to limit the disclosure, the description of the members with appellations from which part or the entire limitation such as the shape or the material is eliminated is included as an aspect of the disclosure.

In the first embodiment, the cover member 55 (FIG. 3) is provided with the polarizing plate supporting strip 555. However, according to an aspect of the disclosure, the cover member 55 may not be provided with the polarizing plate supporting strips 555, and the optical converting unit 5 is not provided with the incoming-side polarizing plate 57.

In the second and third embodiments, the polarizing plate supporting strip may be provided on the holding members 54A, 54B. In other words, a configuration in which both edges of the openings 543 of the holding members 54A and 54B in the X-axis direction are bent and extended in the −Z-axis direction, and the distal ends in the −Z-axis direction are bent outward in the X-axis direction whereby the polarizing plate supporting strip is formed. In these polarizing plate supporting strips, the incoming-side polarizing plate is bonded as in the first embodiment. In this arrangement, since the supporting surface is formed integrally on the second fixed member, reduction of the number of components, reduction of the cost, and the reduction of the weight of the optical device 44 can be achieved.

In the first embodiment, the optical element holding unit 71 of the hexaxial adjusting device 7 holds the cover member 55 by inserting the chucks 73 into the holes 554 of the cover member 55. However, according to an aspect of the disclosure, the optical element holding unit 71 may be provided with an adsorbing structure and hold the cover member 55 by adsorption. More specifically, a configuration in which a ring member formed of rubber is bonded to the end surface of the cover member 55 in the −Z-axis direction, and the cover member 55 is held by the optical element holding unit 71 adsorbing the ring member may be employed.

By employing aluminum for the holding members 54, 54A to 54C to which the liquid crystal panels 53 are bonded, the holding members 54, 54A to 54C can absorb and discharge heat generated from the liquid crystal panel 53 efficiently.

According to an aspect of the disclosure, in addition to the incoming-side polarizing plate 57 and the outgoing-side polarizing plate 58, it is also possible to provide, for example, a visual angle correcting plate, a phase difference plate, various optical filters, and so on as the optical converting element.

The disclosure can be applied to an optical device and a projector.

The entire disclosure of Japanese Patent Application No. 2005-340831, filed Nov. 25, 2005 is expressly incorporated by reference herein.

What is claimed is:

1. An optical device comprising:
   a plurality of light modulating devices for forming optical images by modulating a plurality of color lights into image information for each color light, each of the light modulating devices comprising a liquid crystal panel that is not provided with a frame member; and
   a color combining optical device having a plurality of light flux incoming end surfaces opposing the respective light modulating devices for combining optical images formed by the respective light modulating devices, wherein
   the optical device includes a first fixed member and a second fixed member for mounting the light modulating devices so as to face the light flux incoming end surfaces of the color combining optical device,
   the first fixed member includes a plate-shaped first base portion mounted to oppose the light flux incoming end surface and having an opening for transmitting the light flux and a pair of first upright strips extending upright from an outer peripheral edge of the first base portion toward the light flux incoming side and opposed to each other,
   the second fixed member includes a plate-shaped second base portion having an opening for transmitting the light flux and a pair of second upright strips extending upright from an outer peripheral edge of the second base portion toward the light flux outgoing side and opposed to each other,
   the liquid crystal panel is directly bonded by an adhesive agent to a peripheral edge of the opening of the second base portion of the second fixed member,
   the optical device further comprises a shielding member being interposed between the liquid crystal panel and the first base portion of the first fixed member, the shielding member being formed by performing sheet-metal-processing on a plate-shaped metal plate, the shielding member comprising:
a substrate surface having an opening for transmitting light, the substrate surface being disposed on a side of the liquid crystal panel opposite the second base portion of the second fixed member, and
a plurality of locking strips extending from the substrate surface toward the second base portion of the second fixed member, the plurality of locking strips being engaged with engaging holes defined in the second fixed member, and
the first fixed member and the second fixed member are assembled in such a manner that:
the first base portion of the first fixed member and the second base portion of the second fixed member are opposed to each other,
the liquid crystal panel and the shielding member are disposed between the first base portion of the first fixed member and the second base portion of the second fixed member; and
the first upright strips and the second upright strips slide with respect to each other.

2. The optical device according to claim 1, wherein the first fixed member and the second fixed member are formed by performing sheet-metal-processing onto a plate-shaped metal plate.

3. The optical device according to claim 1, further comprising:
a cover member arranged on the light flux incoming side of the liquid crystal panel and having an opening for transmitting the light flux.

4. The optical device according to claim 3, wherein the cover member is formed by performing sheet-metal-processing on a plate-shaped metal plate.

5. The optical device according to claim 3, further comprising:
an optical converting element for optically converting an incoming light flux and emitting the same, wherein
the cover member includes a supporting surface for supporting the optical converting element on the light flux incoming side thereof.

6. The optical device according to claim 1, wherein the liquid crystal panel is bonded to the light flux outgoing side of the second base portion of the second fixed member.

7. The optical device according to claim 1, wherein one of the pair of first upright strips and the pair of second upright strips are formed with holes, and the other one of those are formed with projections to be inserted into the holes.

8. A projector comprising:
a light source device;
an optical device according to claim 1; and
a projecting optical system for projecting the optical image formed on the optical device in an enlarged scale.

9. The projector according to claim 8, wherein the first fixed member and the second fixed member are formed by performing sheet-metal-processing onto a plate-shaped metal plate.

10. The projector according to claim 8, further comprising:
a cover member arranged on the light flux incoming side of the liquid crystal panel and having an opening for transmitting the light flux.

11. The projector to claim 10, wherein the cover member is formed by performing sheet-metal-processing on a plate-shaped metal plate.

12. The projector according to claim 10, further comprising:
an optical converting element for optically converting an incoming light flux and emitting the same, wherein
the cover member includes a supporting surface for supporting the optical converting element on the light flux incoming side thereof.

13. The projector according to claim 8, wherein the liquid crystal panel is mounted to the light flux outgoing side of the second base portion of the second fixed member.

14. The projector according to claim 8, wherein one of the pair of first upright strips and the pair of second upright strips are formed with holes, and the other one of those are formed with projections to be inserted into the holes.

* * * * *